United States Patent

[11] 3,631,489

[72] Inventor George P. Cooper
Corona Del Mar, Calif.
[21] Appl. No. 863,192
[22] Filed Oct. 2, 1969
[45] Patented Dec. 28, 1971
[73] Assignee North American Rockwell Corporation

[54] MTI SYSTEM HAVING IMPROVED DISCRIMINATION OF TARGETS DISPLAYING AMBIGUOUS DOPPLER SHIFTS
10 Claims, 11 Drawing Figs.

[52] U.S. Cl. .................................................. 343/7.7
[51] Int. Cl. .................................................. G01s 9/42
[50] Field of Search .................................... 343/7.7

[56] References Cited
UNITED STATES PATENTS
3,023,409 2/1962 Smith et al. ................. 343/7.7 X
3,066,289 11/1962 Elbinger ..................... 343/7.7
3,134,101 5/1964 Dickey, Jr. .................. 343/7.7
3,408,647 10/1968 Dynan et al. ................. 343/7.7

Primary Examiner—Malcolm F. Hubler
Attorneys—L. Lee Humphries, H. Fredrick Hamann and Rolf M. Pitts ABSTRACT: An azimuthally scanning, pulse-energy system employing doppler processing of clutter-referenced received echoes of pulsed transmission, including means for improved discrimination between high-speed moving targets displaying ambiguous doppler shifts and targets of lesser velocity. The pulse repetition rate of the pulsed energy system is periodically alternated between two rates, and the received signals associated with each pulse repetition rate separately doppler processed. Variations in the apparent doppler shift of a target in response to variation in the system pulse repetition rate is deemed indicative of a target of interest.

INVENTOR.
GEORGE P. COOPER
BY
ATTORNEY

Patented Dec. 28, 1971

INVENTOR.
GEORGE P. COOPER

BY Roy M. Pitts

ATTORNEY

Patented Dec. 28, 1971

*INVENTOR.*
GEORGE P. COOPER

BY Roy M. Pitts

ATTORNEY

Patented Dec. 28, 1971

INVENTOR.
GEORGE P. COOPER

BY Roger Pitts

ATTORNEY

MTI SYSTEM HAVING IMPROVED DISCRIMINATION OF TARGETS DISPLAYING AMBIGUOUS DOPPLER SHIFTS

CROSS-REFERENCE TO COPENDING APPLICATIONS

1. U.S. application Ser. No. 738,722 filed June 12, 1968, by M. J. Dentino for AMTI Range Ambiguity Resolver.

BACKGROUND OF THE INVENTION

The conceptual discrimination of a detected moving target from a clutter background at the range of such detected target and relative to which clutter the target is moving radially, by means of the difference in doppler shifts therebetween, is well understood in the radar art. Such doppler processing technique is described, for example, in U.S. Pat. No. 3,408,647, issued to F. J. Dynan et al. for AMTI Radar System. In the detection of moving targets at maximum radar ranges, low pulse repetition rates may be employed by the pulsed energy transmitter in order to avoid "second time around" echoes or range ambiguities in the target data of interest. However, such low pulse repetition frequencies may result in blind spots and spectral ambiguities in the doppler processing of the received signals. In other words, the increased number of PRF spectrum lines of lesser frequency spacing (in the received signal spectra) provides increased masking of the received signal spectra, while also increasing the ambiguity of the observed doppler shift of target signals occurring between such PRF spectrum lines. Such masking effect is known in the art, being discussed in U.S. Pat. No. 3,417,396, issued to F. J. Stiftner et al. for Moving Target Indication System Using A Staggered Repetition Rate. Such patent teaches the use of a selectively adjustable delay line canceler, adjusted in synchronism with the repetition rate of a staggered repetition rate coherent radar system, to effect clutter suppression. However, such citation does not address itself to resolving ambiguities in the doppler data of observed moving targets, associated with lower PRF's.

The use of high PRF's, having increased frequency spacing between the PRF spectral lines of the received signals, will tend to reduce the range of target velocities subject to ambiguities in the doppler processor. However, the reduced system transmitter pulse repetition intervals associated with such higher pulse repetition rates, tend to cause "second time around" echoes from targets at a maximum radar range, as discussed in copending U.S. application Ser. No. 738,722, for AMTI Range Ambiguity Resolver, filed June 12, 1968, by M. J. Dentino, assignor to North American Rockwell Corporation, assignee of the subject invention. Such reference, while teaching the preselective variation of the PRF of a pulse doppler system for reducing range ambiguities, does not address itself to doppler velocity ambiguities.

U.S. Pat. No. 3,441,930, to G. M. E. van den Broek D'obrenan, et al., for Doppler Radars discloses the use of a randomly jittered pulse repetition interval in a coherent pulse doppler radar for both reducing the blind speeds associated with fixed PRF spectral lines and reducing the effects of "second time around" echoes. However, a complex sampler arrangement is required in order to sort out data for like pulse repetition intervals, from among the interleaved data of randomly jittered pulse repetition intervals, for loading appropriate memory bank elements from which the doppler date of interest may be read. A second complex sampling and filter bank operation is then employed to obviate any ambiguity in the indicated doppler data, for determining the sense (direction) and magnitude of the target radial velocity to within 50 meters per second. Such reference, however, in addition to representing a complex mechanization, does not appear to readily lend itself (without further modification) to use on a moving airborne vehicle for distinguishing low-level, high-speed target aircraft (of small radar reflectivity and near ranges) from low-speed ground targets of higher radar reflectivity at greater ranges, such as tanks, freight trains, wind mills and the like.

In other words, the prior art does not appear to provide a simple yet effective mechanization for avoiding ambiguities in target range and doppler velocity, in the airborne detection of small, high-speed, low-level targets from a moving vehicle.

SUMMARY OF THE INVENTION

By means of the concept of the subject invention, a dual PRF pulse doppler radar system is provided, whereby the above-noted shortcomings and limitations of the prior art are avoided.

In a preferred embodiment of the invention, there is provided a pulse doppler system. There is also provided means for improving the discrimination between targets of interest displaying ambiguous doppler shifts and targets of lesser velocity, comprising programming means for operating the system (for alternate periods of successive pluralities of pulse repetition periods) at a mutually exclusive one of two pulse repetition rates, whereby the doppler processor provides a book of range trace data for that plurality of successive pulse repetition intervals associated with each pulse repetition frequency. Detector means responsive to a video readout mode of the pulse doppler system provides a clutter-suppressed video output. There is further provided logic means responsive to the output of the detector means for comparing the clutter-suppressed range-trace outputs of successive ones of the alternate periods, for determining the range-time occurrence of a spectral mismatch.

In normal operation of such arrangement, the range-time occurrence of such a spectral mismatch between the clutter-suppressed, doppler-processed range trace signals for the two different pulse repetition periods is indicative of a doppler ambiguity indicative of a high-speed target of interest; whereas the absence of a clutter-suppressed spectral content at a given range bin for one pulse repetition rate, in the presence of a clutter-suppressed spectral content at such range bin for the second pulse repetition rate, is merely indicative of a range ambiguity condition, not of interest.

Accordingly, it is an object of the invention to provide a pulse doppler system responsive to doppler ambiguities and having reduced sensitivity to range ambiguities.

It is another object of the invention to provide a pulse doppler system responsive to doppler ambiguities and having reduced sensitivity to nonambiguous doppler velocity targets.

It is a further object to provide a pulse doppler system of improved performance with is simple to mechanize.

These and other objects of the invention will become apparent from the following description, when taken together with the following drawings in which:

BRIEF DESCRIPTION OF THE DRAWINGS

In the figures, like reference characters refer to like parts.

DESCRIPTION OF THE PREFERRED EMBODIMENTS

Figure 1:
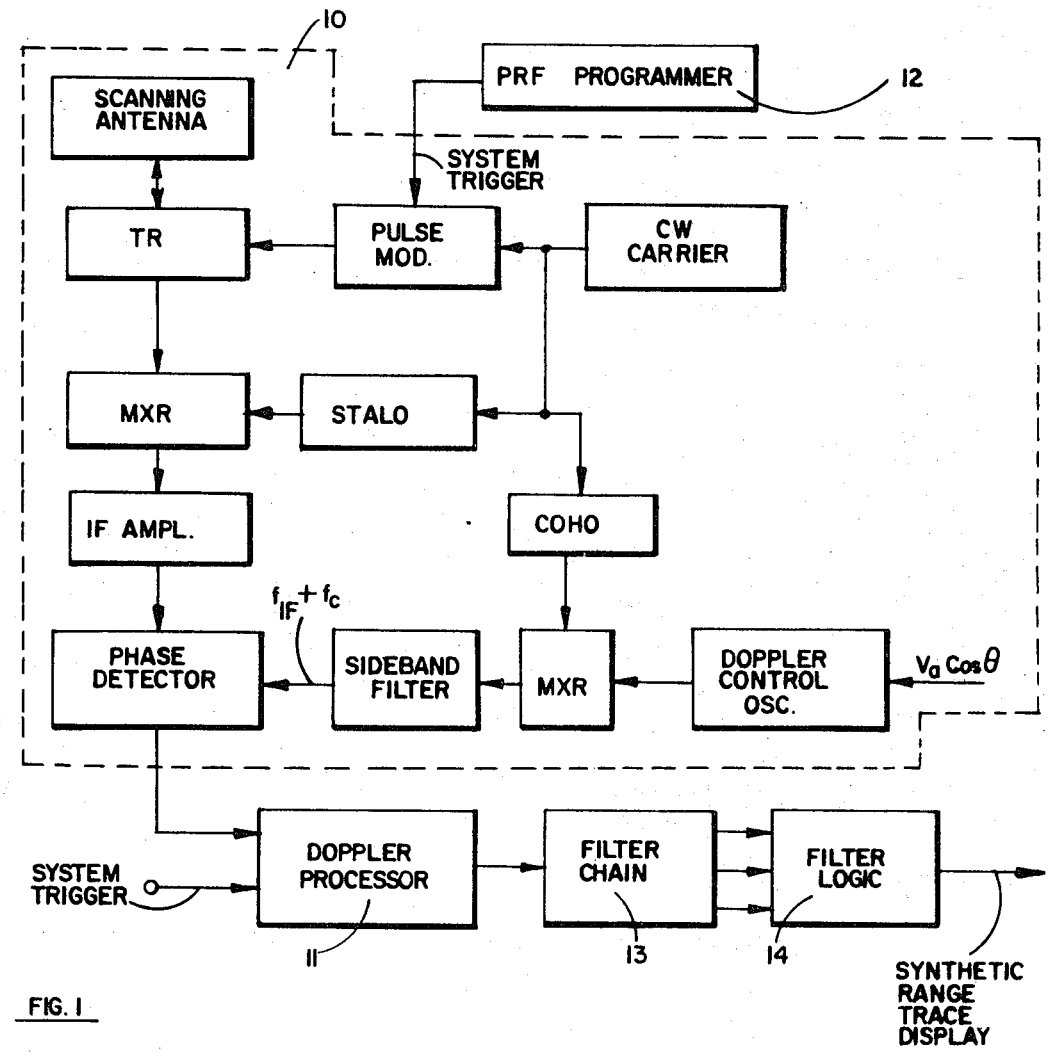
FIG. 1 is a block diagram of a system in which the concept of the invention may be advantageously employed.

Referring to FIG. 1, there is illustrated a block diagram of a system in which the concept of the invention may be advantageously employed. There is provided an exemplary coherent pulse doppler system comprising a coherent AMTI radar 10 of the type illustrated, for example, in FIG. 4.44 of "Introduction to Radar Systems," by M. I. Skolnik, published by McGraw-Hill (1962). There is also provided a doppler processor 11, such as a scan converter or other suitable means, known in the art, per se, responsive to the clutter-referenced range-trace signal output of the receiver phase-detector of radar 10 for recovering the doppler-spectral content in the range trace signal history. The cooperation and control of a scan converter for such purpose is described, for example, in U.S. Pat. No. 3,408,647, to F. J. Dynan et al. for AMTI Radar System, although suitable digital means may be employed. Programmer means 12 provides a system trigger input to transmitter-pulse modulation of radar 10 and a control input to doppler processor 11. Programmer means 12 operates the pulsed radar system at a mutually exclusive one of two alternate pulse repetition intervals.

Figure 2:
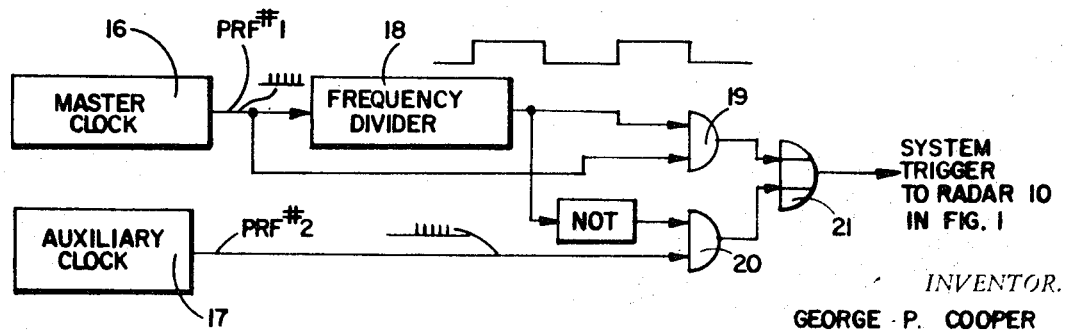
FIG. 2 is a block diagram of an exemplary arrangement of the programmer of FIG. 1.

An exemplary arrangement for programming means 12, as shown in block form in FIG. 2, may comprise a master clock 16 for providing a periodic output corresponding to a first pulse repetition rate (PRF No. 1) and an auxiliary clock 17 providing a second periodic output corresponding to a second pulse repetition rate (PRF No. 2). A frequency divider 18, responsive to master clock 16, provides a periodic two-state output, the periodicity of which corresponds to a plurality of the pulse repetition intervals provided by either of clocks 16 and 17. The mutually exclusive states of the two-state output of frequency divider 18 are used to alternately gate respective ones of the two pulse repetition frequencies. For example, a first coincidence or AND-gate 19 responsive to the output of clock 16 and a first output state of divider 18 gates-on PRF No. 1 at an input to OR-gate 21 and gates-off PRF No. 1 during the second output state of divider 18. Similarly, a second AND-gate 20 responsive to the output of clock 17 and the second output state of divider 18 gates-on PRF No. 2 at an input to OR-gate 21 and gates-off PRF No. 2 during the first output state of divider 18.

The two-state output of divider 18 may also be utilized for control of doppler-processor 11 in FIG. 1. Such processor may employ at least two scan converter means: one into which data for successive pulse repetition intervals at one PRF is being read in, while data for a previous succession of pulse repetition intervals at the second PRF (stored in the other scan converter) is being read out. In other words, a batch system of data processing is used, each batch corresponding to a data book of range trace signals received over the period of successive pulse repetition intervals for a given one of the pulse repetition frequencies.

The clutter-referenced readout or output of processor 11 (in FIG. 1) is fed to a filter chain 13 or plurality of commonly input-connected doppler filters having mutually exclusive center frequencies and substantially contiguous bandwidths, for allowing examination of separate portions of the doppler spectrum of interest. The outputs of each of such filters is then fed to filter logic means 14 for determining the presence of a detected moving target having an ambiguous doppler velocity of interest.

Figure 3:
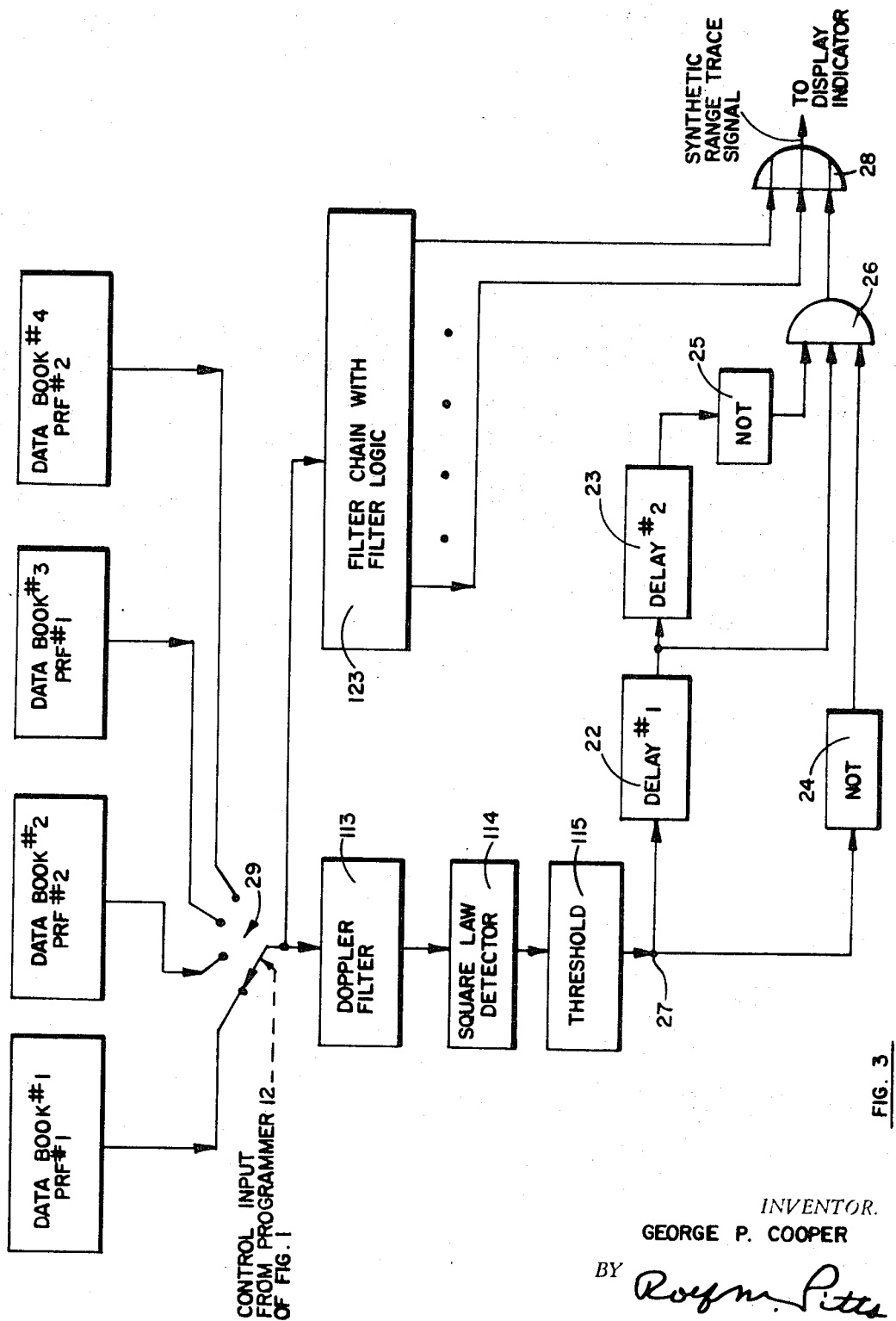
FIG. 3 is a block diagram of the filter and filter logic of FIG. 1.

The filter logic associated with each doppler filter of the filter chain 13 is shown in greater particularity in FIG. 3.

Referring now to FIG. 3, there is illustrated in fuller detail the filter logic means 14 of FIG. 1 in cooperation with the doppler processor associated therewith. There is provided selective readout means 29 for reading out the doppler-processed data associated with successive ones of the data book-acquired at each of the two pulse repetition frequencies. Although readout means 29 has been schematically shown as a four-position rotary switch operated in response to a stepping or control input from programmer 12 (of FIG. 1), in practice switch 29 may be periodically switched from one to the other of two states, each state corresponding to a mutually exclusive one of two scan converter elements, as is understood in the art. Alternately, a number of data books may be stored sequentially on different portions of a single storage tube and readout means 29 involving control for reading out a selected portion of the storage tube.

There is also provided a doppler filter 113 responsively coupled to readout means 29 and corresponding a single filter of the filter chain 13 of FIG. 1. The doppler-filtered output of filter 113 is square-law detected by a diode or the like operated in a nonlinear or square law region of operation, and the detected, doppler-filtered synthetic range trace signal is thresholded to reduce the probability of a false alarm response to strictly noise content. Thus, elements 114 and 115 in FIG. 3 comprise detector means responsive to a doppler-filtered output of the pulse doppler system for providing a clutter suppressed video output. Such signal may then be processed by suitable filter logic for distinguishing a moving target having an ambiguous doppler velocity of interest.

The logic means associated with first doppler filter 113 includes a first storage or delay element 22 responsively coupled to the thresholded detector combination of elements 114 and 115 for retrievably storing the response of filter 113 to one of the data periods of mutually exclusive pulse repetition rates and corresponding to a data book. There is also provided second storage means responsively coupled to an output of the first storage means 22, first NOT logic means 24 responsively coupled to the output of threshold means 115, second NOT logic means responsively coupled to an output of second storage means 25, and coincidence or AND logic means 26 responsively coupled to an output of each of first and second NOT logic means for indicating the range time occurrence of an ambiguous doppler shift of interest.

In normal operation of the above-described arrangement of FIG. 3, a doppler filter video range trace signal is successively delayed by each of delay means 22 and 23 by an interval corresponding to that between the readout of corresponding portions of successive data books. Thus, when (for example) a doppler filter range trace signal corresponding to data book No. 1 (for PRF No. 1) occurs at the output of delay element 23, then a range trace signal corresponding to data book No. 2 (for PRF No. 2) occurs at the output of delay element 22, and a range trace signal corresponding to data book No. 3 (for PRF No. 1) occurs on input terminal 27 of the filter logic.

The cooperation of such logic arrangement for signalling the range-time occurrence of a high-speed target of interest, displaying an ambiguous doppler shift, may be appreciated from a consideration of FIGS. 4A–D and 5A–D.

Figure 4A:
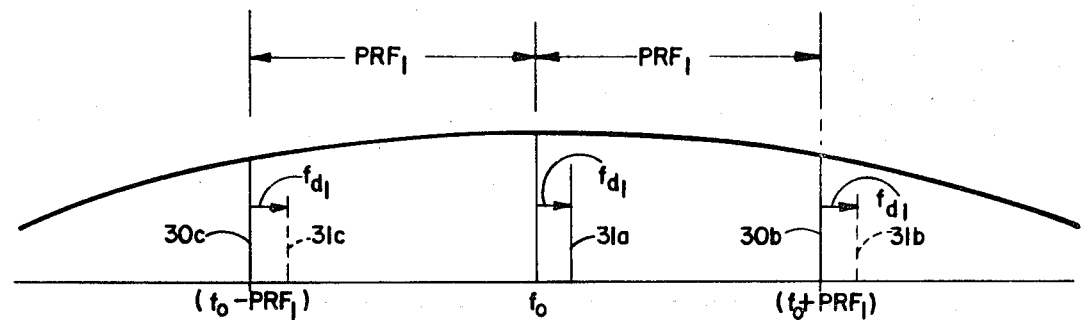
FIGS. 4A–D and 5A–D are spectral diagrams illustrating the responses of the system to various states thereof.

Referring to FIGS. 4A–D, there is illustrated a family of spectral responses of the system of FIG. 1, including doppler filter 113 and associated logic of FIG. 3, to a doppler-processed receiver signal indicative of a (nonambiguous) moving target—one having a doppler shift lying within the bandpass of filter 113. FIG. 4A illustrates the spectral response of radar 10 (of FIG. 1) when operated at a first pulse repetition frequency ($PRF_1$). The spectral response of the received signal (lines $31a$, $31b$ and $31c$) is shown as shifted to the right of the transmitter spectral lines $30a$, $30b$ and $30c$ by a doppler frequency, $f_{d_1}$ (corresponding to a closing range rate), which is considerably less than the frequency interval ($PRF_1$) between the transmitter spectral lines $30a$, $30b$ and $30c$ as to be indicative of a relatively slow-moving target. The doppler-processed signal $131a$ (in FIG. 4C) for a first data book, where within the bandpass 33 of doppler filter 113, may then be detected and applied as an input to terminal 27 of the logic network associated therewith, and delayed by delay element 22 for a time interval corresponding to the generation and readout of the next data book (data book No. 2 at PRF No. 2).

Figure 4B:
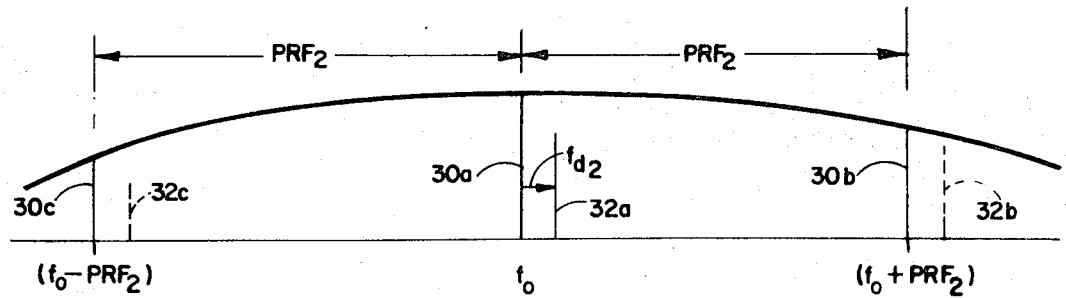
Figure 4C:
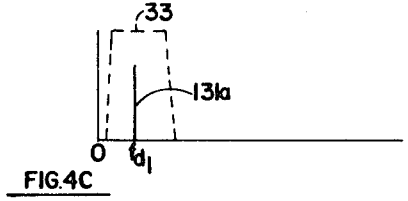
Figure 4D:
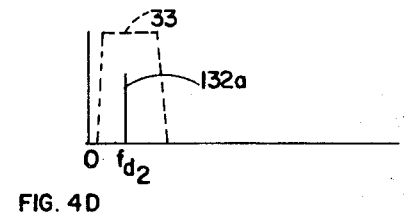

FIG. 4B illustrates the spectral response of radar 10 (of FIG. 1) when operated at a second pulse repetition rate greater than the first rate ($PRF_2 > PRF_1$) by at least twice the passband ($f_{BW}$) of filter 113, the received signal spectra (lines $32a$, $32b$ and $32c$) being doppler-shifted by the amount $f_{d_2}$. Where the receiver response of FIG. 4B represents the same target as that represented in FIG. 4A, the doppler shift $f_{d_2}$ will similarly occur within the doppler filter bandpass 33 (as shown by line $132a$ in FIG. 4D). Thus, by comparing the corresponding range time trace of the doppler processed data books (data book No. 1 for PRF No. 1 and data book No. 2 for PRF No. 2), the common range time occurrence of a moving target signal indicates a nonambiguous slow-moving target, not of interest. Such delayed first moving target signal state at the output of delay element 22 and the reversal of the like second moving target signal state (by NOT logic element 24) in FIG.

3 provide noncoincident signal states at the input to coincidence gate 26, resulting in no signal output therefrom.

The delay of the second and delayed first doppler-filtered data books by an additional data book interval (by means of delay element 22 and 23, respectively, in FIG. 3) and doppler filtering the doppler processed range signal for a subsequent data book (data book No. 3 at PRF No. 1) allows logic processing of such three data books as a data set. Thus, the coincidence of a like signal state at the output of delay 23, the output of delay 22 and on terminal 27 for a respective one of data book No. 1 (at PRF No. 1), data book No. 2 (at PRF No. 2) and data book No. 3 (at PRF No. 1), corresponding to a nonambiguous slow-moving target, results in mutually like signal states at the outputs of NOT elements 24 and 25, which are unlike the signal state at the output of element 22. Accordingly, these three outputs, being coincident in range-time but not being coincident in signal state, do not produce a moving target indicator signal at the output of AND-gate 26.

The cooperation of the filter logic arrangement of FIG. 3, in response to a moving target occurring at a nonambiguous range and having an ambiguous doppler velocity, is shown in FIGS. 5A–5D.

Figure 5A:
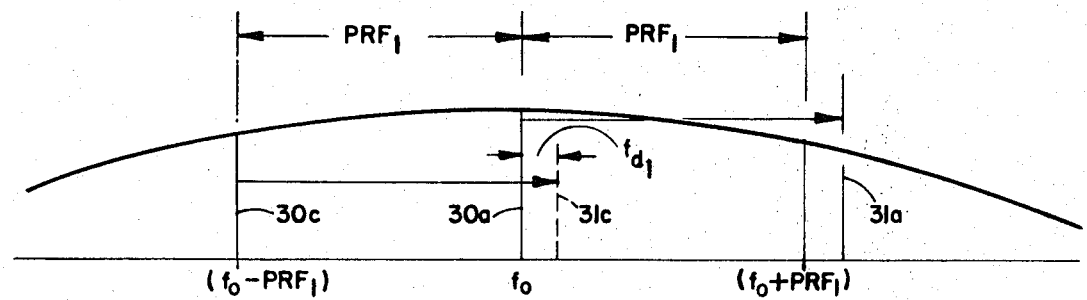

Referring to FIGS. 5A–5D, there is illustrated a family of spectral responses of the system of FIG. 1 to a moving target having an ambiguous doppler shift, $f_{d_2}$—a doppler shift substantially greater than or outside the doppler filter passband. FIG. 5A illustrates the spectral response of radar 10 (FIG. 1) when operated at $PRF_1$, lines 31a, 31b and 31c of the receiver spectral response to a closing range rate target being doppler shifted relative to the transmitter spectral lines 30a, 30b and 30c, respectively by the doppler frequency $f_{d_1}$. Detection and doppler-processing of the data results in a series of spectral lines 131a and 131c in FIG. 5C occurring at frequencies corresponding to the displacement of the receiver spectral lines 31a and 31c from the reference or carrier frequency $f_o$ in FIG. 5A, as by folding the spectra about $f_o$ and translating $f_o$ to zero, as is well understood in the art.

Thus, the doppler-processed output of, say, data book No. 1 (in FIG. 3) or input to filter 113 may be spectral line 131a at a frequency $f_{d_1}$, corresponding to the doppler shift of line 31a relative to line 30a in FIG. 5A and lying outside the bandpass 33 of filter 113 (of FIG. 3). An additional spectral line 131c (corresponding to line 31c) may occur at a frequency ($PRF_2 - f_{d_2}$) within the filter passband 33, as to result in a filter output indicative of a moving target but not indicative of the proper doppler velocity ($f_{d_2}$) thereof. In other words, the moving target signal output of filter 113 (in FIG. 3), not being indicative of the actual doppler shift, is therefore ambiguous in that regard.

Figure 5B:
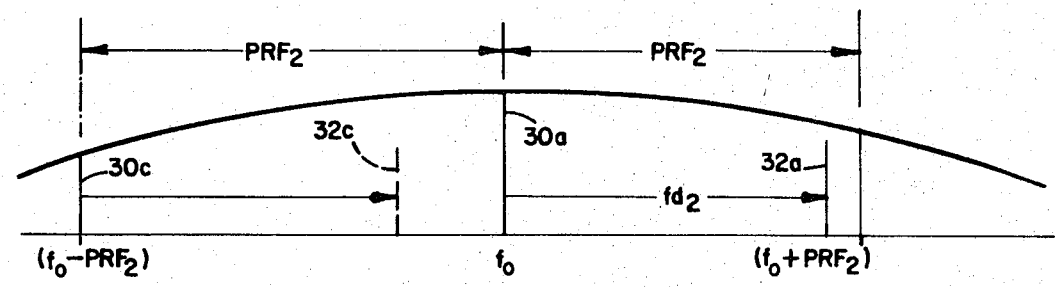
Figure 5C:
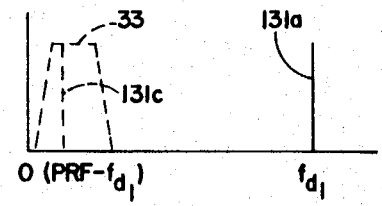
Figure 5D:
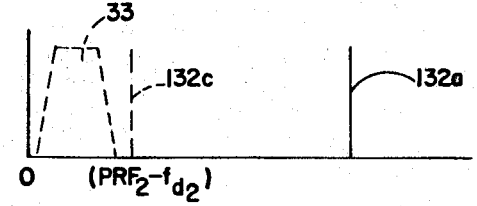

Referring now to FIG. 5B, there is illustrated the spectral response of radar 10 (of FIG. 1) when operated at a second pulse repetition rate ($PRF_2 = PRF + f_{BW}$), the received signal spectral lines 32a, 32b and 32c being doppler-shifted by the amount $f_d$. Thus, the doppler-processed data for, say, data book No. 2 (in FIG. 3) appears in FIG. 5D as spectral lines 131a and 131c, corresponding to the frequency spacing between reference line 30a and lines 32a and 32c, respectively, of FIG. 5B; both of which lines 132a and 132c are seen to lie outside bandpass 33. Line 131a lies outside band-pass 33 in FIG. 5D for like reasons as line 131a in FIG. 5C, while line 132c in FIG. 5D lies outside bandpass 33 as a consequence of the system pulse repetition rate having been increased by an amount corresponding to such bandpass. Accordingly, no moving target signal occurs at the output of filter 113 (in FIG. 3) for data book No. 2.

Now, by comparing the thresholded and detected, doppler-filtered range signal for data book No. 2 (PRF No. 2) with that for data book No. 1 or No. 3 (PRF No. 1), a signal state difference at corresponding ranges is seen to be indicative of a moving target of interest, having an ambiguous doppler velocity. The delay of doppler-filter data book No. 1 for two book intervals (by means of delay elements 22 and 23 in FIG. 3) and the delay of doppler filter data book No. 2 (by means of element 22) allows comparisons of corresponding range trace portions thereof with those of doppler-filtered data book No. 3. The coincidence of a like signal state at the output delay 23 and on terminal 27, which states are unlike that at the output of delay 22, correspond to a moving target of interest having an ambiguous doppler velocity and result in mutually like signal states at the outputs of NOT elements 24 and 25 which are like the signal state at the output of element 22. These three outputs, being coincident in both range time occurrence and signal state, produce a moving target indicator signal at the output of AND-gate 26 for the spectral condition of FIG. 4.

Although the invention has been described in terms of the cooperation of data books Nos. 1, 2 and 3 in FIG. 3, it is clear that such description is exemplary only and that the system cooperates as described in response to any set of successive data books of alternate pulse repetition rates. Also, although the doppler processing arrangement of FIG. 3 has been described in terms of a single narrow band-pass doppler filter 113 and associated logic, it is clear that an entire doppler bandpass of interest may be covered by a chain or plurality of additional filters of contiguous bandpasses and having associated logic (all shown as block 123 in FIG. 3) for cooperation with OR-gate 28, for the generation of a synthetic range trace signal. Accordingly, data processing means has been described for preselectively distinguishing a moving target of interest and having an ambiguous doppler velocity.

Although the invention has been illustrated and described in detail, it is to be clearly understood that the same is by way of illustration and example only and is not to be taken by way of limitation, the spirit and scope of this invention being limited only by the terms of the appended claims.

I claim:

1. In a pulse doppler system having a doppler-filtered range trace output means for improving the discrimination between high-speed moving targets of interest displaying ambiguous doppler shifts and targets not of interest of lesser velocity, comprising
   means for operating said system for alternate periods of successive pluralities of pulse repetition intervals at a mutually exclusive one of two alternate pulse repetition rates;
   detector means responsive to a doppler-filtered output of said pulse doppler system for providing a clutter-suppressed video output; and
   logic means responsive to said detector means for comparing the doppler-filtered range trace output of said system for one of said alternate periods with a second successive one of said alternate periods for signalling the range-time occurrence of a high-speed moving target of interest displaying an ambiguous doppler shift.

2. The device of claim 1 in which said logic means comprises
   first storage means responsively coupled to said detector means for retrievably storing the response of said pulse doppler system to at least one of said two alternate periods of mutually exclusive pulse repetition rates;
   second storage means responsively coupled to an output of said first storage means;
   first NOT logic means responsively coupled to said detector means;
   second NOT logic means responsively coupled to an output of said second storage means; and
   AND logic means responsively coupled to the output of said first storage means and to an output of each of said first and second NOT logic means for indicating the occurrence of an ambiguous doppler shift of interest.

3. In an azimuthally scanning, pulsed-energy system employing doppler processing of clutter-reference received echoes of pulsed transmission, means for improving the discrimination between high-speed moving targets displaying ambiguous doppler shifts and targets of lesser velocity, comprising programming means for periodically alternating the pulse repetition rate of said pulsed energy system between two mutually exclusive rates, whereby a book of range trace data is provided for a plurality of successive pulse repetition intervals associated with each pulse repetition frequency;

doppler-filtered detector means responsive to a video readout mode of said doppler processing for suppressing a clutter reference component of said video readout mode; and filter logic means responsive to the output of said detector means for successive data books for indicating the occurrence at a given range time within a range trace interval of the pulsed energy system, of a moving target having an ambiguous doppler shift of interest.

4. In pulsed energy system employing doppler processing of clutter-referenced received echoes of pulsed transmission, means for improving the discrimination between high-speed moving targets displaying ambiguous doppler shifts and targets of lesser velocity, comprising programming means for alternating the pulse repetition rate of said pulsed energy system between two mutually exclusive rates, whereby a book of range trace data is provided for a plurality of successive pulse repetition intervals associated with each pulse repetition frequency;

doppler-filtered detector means responsive to a video readout mode of said doppler processing for suppressing a clutter reference component of said video output mode; and filter logic means responsive to the output of said detector means for successive data books for indicating the occurrence, at a given range time within a range trace interval of the pulsed energy system, of a moving target having an ambiguous doppler shift of interest.

5. The device of claim 4, in which said logic means comprises means responsive to a clutter-suppressed video readout mode of said doppler processing for each of at least two successive data books for indicating a variation in the observed doppler shift of a moving target commonly observed in a common range bin in said data books.

6. The device of claim 4 in which said doppler-filtered detector means comprises a filter chain of at least two narrow band-pass doppler filters, the center frequencies of which are mutually exclusive, the bandpasses of successive filters being substantially mutually contiguous, an input of each of said filters being commonly responsive to said video readout, and a like plurality of threshold amplitude detectors as filters, each detector being responsive to an output of a mutually exclusive one of said filters, said filter logic means being responsive to a difference in the output state response of at least one of said filtered detector means to at least two successive data books, the range time occurrence of said response difference being indicative of a moving target of interest.

7. The device of claim 6 in which said filter logic means comprises storage means responsive to a preselected one of said detectors for retrievably storing the response of said detector to at least one of the two data books, gating means for providing an output signal in response to a difference in response states between corresponding range time portions of the detector responses to said two data books.

8. The device of claim 6 in which said logic means comprises first storage means responsively coupled to one of said detectors for retrievably storing the response of said pulse doppler system to at least one of said two alternate periods of mutually exclusive pulse repetition rates;

second storage means responsively coupled to an output of said first storage means;

first NOT logic means responsively coupled to said one detector;

second NOT logic means responsively coupled to an output of said second storage means; and AND logic means responsively coupled to the output of said first storage means and to an output of each of said first and second NOT logic means for indicating the coincidence of an ambiguous doppler shift of interest.

9. A method for improving the discrimination between high-speed moving targets displaying ambiguous doppler shifts and targets of lesser velocity in an azimuthally scanning pulsed-energy system employing doppler processing of clutter-referenced received echoes of pulsed transmission, comprising the steps of alternating the pulse repetition rate of said pulsed energy system between two mutually exclusive rates, whereby a book of range trace data is provided for a plurality of successive pulse repetition intervals associated with each pulse repetition frequency;

suppressing a clutter reference component of a video readout mode of said doppler processing; and indicating the occurrence at a given range time within a range trace interval of the pulsed energy system, of a moving target having an ambiguous doppler shift of interest.

10. The method of claim 9 in which said step of indicating comprises the steps of comparing the clutter-suppressed video readout mode of said doppler processing for data of one pulse repetition rate with that for data of another pulse repetition rate, and indicating the range time-occurrence of a spectral difference in the spectral states of said compared modes.

* * * * *